(12) United States Patent
Adachi et al.

(10) Patent No.: US 11,079,664 B2
(45) Date of Patent: Aug. 3, 2021

(54) OPTICAL SYSTEM AND IMAGE PROJECTION APPARATUS

(71) Applicants: Kei Adachi, Kanagawa (JP); Yukako Yamaguchi, Kanagawa (JP)

(72) Inventors: Kei Adachi, Kanagawa (JP); Yukako Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/835,320

(22) Filed: Mar. 31, 2020

(65) Prior Publication Data
US 2020/0355993 A1    Nov. 12, 2020

(30) Foreign Application Priority Data

May 10, 2019    (JP) ............................. JP2019-089602

(51) Int. Cl.
*G03B 21/20* (2006.01)
*G02B 27/09* (2006.01)
*H04N 9/31* (2006.01)

(52) U.S. Cl.
CPC ..... *G03B 21/2006* (2013.01); *G02B 27/0961* (2013.01); *G03B 21/2066* (2013.01); *H04N 9/3152* (2013.01)

(58) Field of Classification Search
CPC .... G03B 21/008; G03B 21/28; G03B 21/145; G03B 21/2006; G03B 21/2013;
(Continued)

(56) References Cited

U.S. PATENT DOCUMENTS

2002/0126264 A1    9/2002 Dewald et al.
2003/0202259 A1    10/2003 Nishimae et al.
(Continued)

FOREIGN PATENT DOCUMENTS

CN    1605925 A    4/2005
CN    105474092 A    4/2016
(Continued)

OTHER PUBLICATIONS

Extended European search report dated Sep. 21, 2020, in corresponding to European patent Application No. 20168979.1, 5 pages.
(Continued)

*Primary Examiner* — Sultan Chowdhury
(74) *Attorney, Agent, or Firm* — Xsensus LLP

(57) ABSTRACT

An optical system includes a light source, an illumination optical system, and an optical modulator. The lens array and the lens of the illumination optical system are arranged in that order from an upstream side of an optical path of light from the light source. The light shield is disposed at the upstream side relative to the lens in the optical path. The light shield blocks some rays incident within a range of an effective diameter of the lens. The illumination optical system emits the light to the optical modulator. The optical modulator emits the incident light to a first direction and a second direction different from the first direction. A center of an effective diameter of the lens array is offset from a center of the effective diameter of the lens to an opposite side of the light shield in a direction orthogonal to the optical axis.

20 Claims, 2 Drawing Sheets

(58) Field of Classification Search
CPC ............ G03B 21/2033; G03B 21/2053; G03B 21/2066; G02B 27/0101; G02B 27/0961; G02B 27/1026; G02B 27/1033; H04N 9/3141; H04N 9/3152; H04N 9/3164; H04N 9/3197

See application file for complete search history.

(56) References Cited

U.S. PATENT DOCUMENTS

| | | |
|---|---|---|
| 2003/0234983 A1 | 12/2003 | Baba |
| 2004/0263817 A1* | 12/2004 | Tanitsu ............... G03F 7/70108 355/67 |
| 2007/0064198 A1* | 3/2007 | Yoshimura ......... G03B 21/2073 353/20 |
| 2009/0009730 A1* | 1/2009 | Destain ................. G03B 21/28 353/84 |
| 2011/0310350 A1 | 12/2011 | Maeda et al. |
| 2012/0162613 A1 | 6/2012 | Liu et al. |
| 2014/0340651 A1* | 11/2014 | Kurashige ................ G02B 5/32 353/38 |
| 2015/0055100 A1* | 2/2015 | Kaneda ................ G02B 3/0043 353/38 |
| 2018/0003964 A1* | 1/2018 | Tatsuno ................. B60K 35/00 |
| 2018/0067385 A1 | 3/2018 | Nakada |

FOREIGN PATENT DOCUMENTS

| | | |
|---|---|---|
| JP | 2003-315733 | 11/2003 |
| JP | 2004-029325 A | 1/2004 |
| JP | 2004-191891 | 7/2004 |
| JP | 2005-202366 | 7/2005 |
| JP | 2007-294346 | 11/2007 |
| JP | 2015-201433 | 11/2015 |
| JP | 2015-230346 A | 12/2015 |
| JP | 2017-129847 | 7/2017 |
| WO | WO1999/049505 A1 | 9/1999 |

OTHER PUBLICATIONS

Office Action dated May 28, 2021 in Chinese Patent Application No. 202010268070.0, 6 pages.

* cited by examiner

OPTICAL SYSTEM AND IMAGE PROJECTION APPARATUS

CROSS-REFERENCE TO RELATED APPLICATIONS

This patent application is based on and claims priority pursuant to 35 U.S.C. § 119(a) to Japanese Patent Application No. 2019-089602, filed on May 10, 2019, in the Japan Patent Office, the entire disclosure of which is hereby incorporated by reference herein.

BACKGROUND

Technical Field

The present disclosure relates to an optical system and an image projection apparatus incorporating the optical system.

Related Art

An image display apparatus provided with a substantially D-shaped aperture is known that cuts off light in an angular region of a digital micromirror device (DMD) (reflective modulation device) where the incident light and the light reflected in the ON direction overlap each other (the "D" shape is formed when interference is removed).

Further, a projection video display device provided with a wavelength selective filter (flare stop) is also known that reflects a wavelength component of some light rays of the light emitted from the light source toward the optical modulation element, with these light reflected by the substrate and incident on the port of the projection optical system.

SUMMARY

In one aspect of this disclosure, there is described an improved optical system including a light source, an illumination optical system, and an optical modulator. The illumination optical system includes a lens array, a lens, and a light shield. The lens array and the lens are arranged in that order from an upstream side of an optical path of light emitted from the light source. The light shield is disposed at the upstream side relative to the lens in the optical path. The light shield is configured to block some light rays of the light within a range of an effective diameter of the lens. The illumination optical system is configured to emit the light to the optical modulator. The optical modulator is configured to emit the light incident on the optical modulator to a first direction and a second direction different from the first direction. A center of an effective diameter of the lens array is offset from a center of the effective diameter of the lens to an opposite side of the light shield in a direction orthogonal to an optical axis of the illumination optical system.

Further described is an image forming apparatus incorporating the optical system described above.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
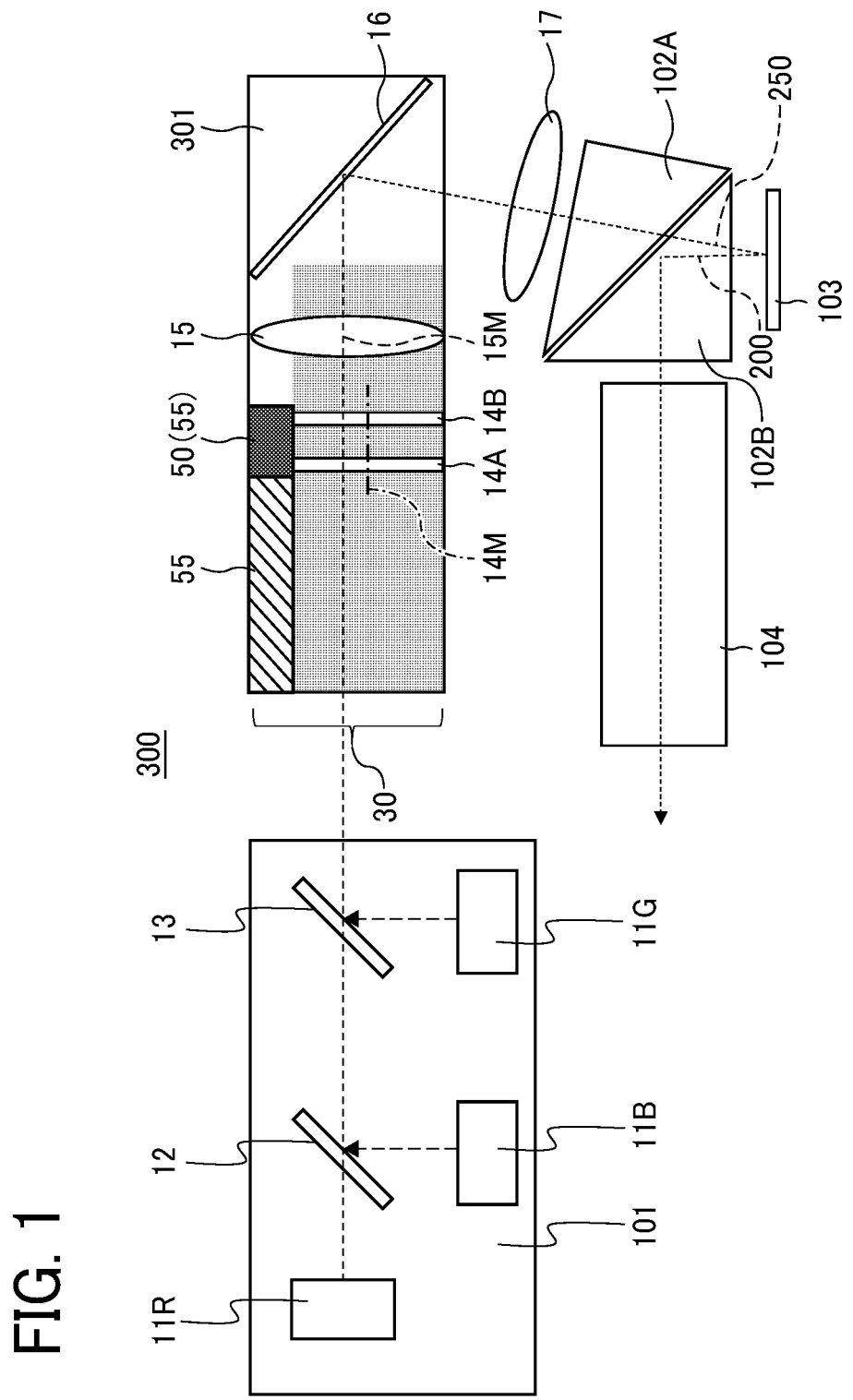
FIG. 1 is a cross-sectional view of an image projection apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

FIG. 1 is a cross-sectional view of an image projection apparatus 300 according to an embodiment of the present disclosure.

The image projection apparatus 300 is a front projection projector, and projects an image onto a screen. The image projection apparatus is assumed to be mounted on an automobile, but is not limited to this example. The image projection apparatus 300 is available for various uses, and is mountable on a motorcycle, an aircraft, or the like.

The image projection apparatus 300 illustrated in FIG. 1 includes a light source 101, an illumination optical system 301, a field lens 17, optical elements 102A and 102B, an optical modulator 103, and a projection optical system 104.

The light source 101 includes three-color light sources 11R, 11B, and 11G corresponding to three colors of red (R), blue (B), and green (G), and dichroic mirrors 12 and 13 configured to reflect light of a predetermined wavelength and transmit light of a certain wavelength.

The illumination optical system 301 includes a first fly-eye lens 14A, a second fly-eye lens 14B, a field lens 15, and a mirror 16, which are spaced apart from each other and arranged in that order from an upstream side of an optical path of light (irradiation light 250) emitted from the light source 101. The illumination optical system 301 is configured to guide the irradiation light 250 emitted from the light source 101 to the optical elements 102A and 102B through the field lens 17.

Further, it is desired that each of the optical elements 102A and 102B is a prism having two or more surfaces. In the present embodiment, the optical elements 102A and 102B are, for example, a total reflection triangular prism unit (that is a total internal reflection (TIR) prism unit).

The optical modulator 103 modulates the light 250 incident on the optical modulator 103 based on image data. The optical modulator 103 is a digital micromirror device (DMD) having a substantially rectangular mirror surface that includes a plurality of micromirrors. The optical modulator 103 drives each micromirror based on input image data in a time-division manner to reflect the light processed to form an image based on the image data.

In such a configuration, the optical elements 102A and 102B cause the irradiation light 250 guided from the illumination optical system 301 incident on the optical modulator 103, thus the irradiation light becomes incident light 250.

The optical modulator 103 alternately emits first light 200 in a first direction and second light in a second direction by time-division driving of each micromirror. In the case of the first light 200, the optical modulator 103 reflects the incident light 250 in the first light to emit the first light 200. In the case of the second light, the optical modulator 103 reflects the incident light 250 in the second direction to emit the second light.

The optical element 102B reflects the first light 200 emitted from the optical modulator 103 in the first direction and transmits the second light emitted from the optical modulator 103 in the second direction.

The first light 200 reflected by the optical element 102B is guided to the projection optical system 104 as ON light forming an image based on image data. The second light emitted from the optical modulator 103 in the second direction serves as OFF light that is not forming an image. For example, the second light is incident on the mechanically textured surface or light absorption band so that re-reflection of the second light is prevented.

The projection optical system 104 projects the first light 200 to a screen to form an image (image formed based on input image data). In some embodiments, the screen may be a multi-layer array (MLA).

In addition to the configuration described above, the illumination optical system 301 further includes a light shield 50 at an upstream side relative to the field lens 15 in the optical path. The light shield 50 is configured to block some light rays of the light that has been emitted from the light source 101 and is to be incident within the range of the effective diameter of the field lens 15. With the light shield 50 blocking the light, unwanted light caused by the light reflected by the surface of the optical modulator 103 can be reduced or eliminated. The unwanted light caused by the light reflected by the surface of the optical modulator 103 is, for example, unwanted light illustrated in FIGS. 3 and 5 in US2017208302 as a comparative example.

In the present embodiment, the center 14M of the effective diameter of the first fly-eye lens 14A and the second fly-eye lens 14B is offset from the center 15M of the effective diameter of the field lens 15 to the opposite side of the light shield 50 along the direction orthogonal to the optical axis of the field lens 15. With this configurations, the light shield 50 side portions of the first fly-eye lens 14A and the second fly-eye lens 14B along the direction orthogonal to the optical axis are excluded from the range of the effective diameter of the first fly-eye lens 14A and the second fly-eye lens 14B.

The first fly-eye lens 14A and the second fly-eye lens 14B are arranged in an area other than a light shield area 55 where the light shield 50 blocks light, in the direction orthogonal to the optical axis. This arrangement enables the illumination optical system 301 to be compact.

Figure 2A:
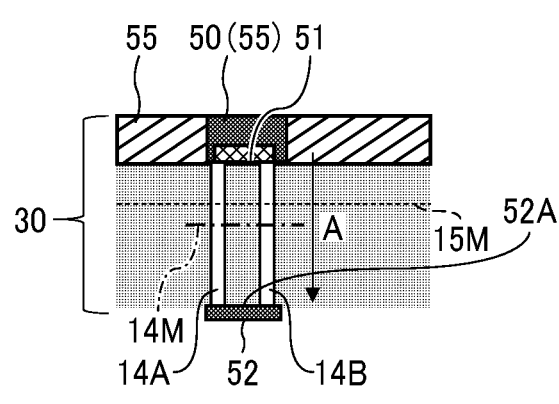
FIGS. 2A and 2B are illustrations of a part of an illumination optical system in the image projection apparatus in FIG. 1.
Figure 2B:
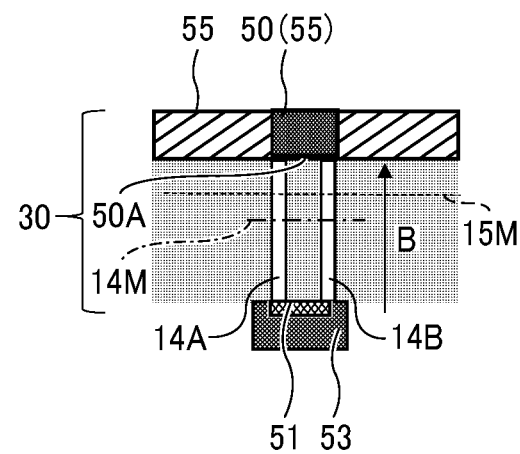

FIGS. 2A and 2B are illustrations of a configuration of a part of the illumination optical system 301 in FIG. 1.

The illumination optical system 301 illustrated in FIG. 2A includes an urging member 51 and an abutting member 52 provided with a contact surface 52A. The urging member 51 urges one end of each of the first fly-eye lens 14A and the second fly-eye lens 14B in the direction orthogonal to the optical axis, and the contact surface 52A abuts against the other end of each of the first fly-eye lens 14A and the second fly-eye lens 14B in the direction orthogonal to the optical axis.

With this configuration, the first fly-eye lens 14A and the second fly-eye lens 14B are positioned in the direction orthogonal to the optical axis.

The urging member 51 is disposed on the light shield 50 side in the direction orthogonal to the optical axis, and urges the first fly-eye lens 14A and the second fly-eye lens 14B toward the direction A in FIG. 2A. The abutting member 52 provided with the contact surface 52A is disposed on the opposite side of the light shield 50 in the direction orthogonal to the optical axis.

This arrangement enables the light shield 50 and the urging member 51 to overlap in the direction orthogonal to the optical axis for a more compact illumination optical system 301.

The illumination optical system 301 illustrated in FIG. 2B is a modified example of the illumination optical system 301 in FIG. 2A. The urging member 51 is disposed on the opposite side of the light shield 50 in the direction orthogonal to the optical axis and urges the first fly-eye lens 14A and the second fly-eye lens 14B in the direction B in FIG. 2B. The contact surface 50A formed on the light shield 50 is disposed at the light shield 50 side in the direction orthogonal to the optical axis.

With this arrangement, the light shield 50 and the urging member 51 do not overlap in the direction orthogonal to the optical axis, which improves the blocking capabilities of the light shield 50.

As described above, the image projection apparatus 300 according to an embodiment of the present disclosure includes a light source 101, a illumination optical system 301, and an optical modulator 103. The illumination optical system 301 includes a lens array (a first fly-eye lens 14A and a second fly-eye lens 14B), a field lens 15, and a light shield 50. The lens array (14A and 14B) and the field lens 15 are arranged in that order from an upstream side of an optical path of light emitted from the light source. The light shield 50 is disposed at the upstream side relative to the field lens 15 in the optical path, and is configured to block some light rays of the light incident within a range of an effective diameter of the field lens 15. The illumination optical system 301 is configured to emit the light to the optical modulator 103. The optical modulator 103 is configured to emit the light 250 incident on the optical modulator 103 to a first direction and a second direction different from the first direction. The center 14M of an effective diameter of the lens array (14A and 14B) is offset from the center 15M of the effective diameter of the field lens 15 to an opposite side of the light shield 50 in a direction orthogonal to an optical axis of the illumination optical system 301.

With this configuration, unwanted light due to the light reflected from the surface of the optical modulator 103 is reduced or eliminated, and the first fly-eye lens 14A and the second fly-eye lens 14B are configured such that the light shield 50 side portions of the first fly-eye lens 14A and the second fly-eye lens 14B are excluded from the range of the effective diameter of the first fly-eye lens 14A and the second fly-eye lens 14B.

The first fly-eye lens 14A and the second fly-eye lens 14B are arranged in an area other than a light shield area 55 where the light shield 50 blocks light, in the direction orthogonal to the optical axis. Accordingly, a compact-sized optical system is provided.

The illumination optical system 301 includes an urging member 51 and a contact surface 50A or 52A. The urging member 51 urges one end of each of the first fly-eye lens 14A and the second fly-eye lens 14B in the direction orthogonal to the optical axis, and the contact surface 50A or 52A abuts against the other end of each of the first fly-eye lens 14A and the second fly-eye lens 14B in the direction orthogonal to the optical axis. Accordingly, the first fly-eye lens 14A and the second fly-eye lens 14B are positioned in the direction orthogonal to the optical axis.

The urging member 51 is disposed on the light shield 50 side in the direction orthogonal to the optical axis, and the contact surface 52A is disposed on the opposite side of the light shield 50 in the direction orthogonal to the optical axis. Accordingly, the light shield 50 and the urging member 51 overlap in the direction orthogonal to the optical axis. Thus, a compact-sized optical system is provided.

Alternatively, the urging member 51 is disposed on the opposite side of the light shield 50 in the direction orthogonal to the optical axis, and the contact surface 50A is disposed on the light shield 50 side in the direction orthogonal to the optical axis. Accordingly, the light shield 50 does not overlie the urging member 51 in the direction orthogonal to the optical axis, and thus the light shield 50 can reliably block light.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. An optical system, comprising:
   a light source configured to emit light;
   an optical modulator; and
   an illumination optical system configured to emit the light to the optical modulator, the illumination optical system including:
   a lens;
   a lens array on an upstream side of the lens in an optical path of the light emitted from the light source; and
   a light shield on the upstream side of the lens in the optical path, the light shield configured to block light rays of the light incident within a range of a first effective diameter of the lens, wherein
   the optical modulator is configured to emit the light incident on the optical modulator, in a first direction and in a second direction different from the first direction, and
   a center of a second effective diameter of the lens array is offset, in a direction orthogonal to an optical axis of the illumination optical system, from a center of the first effective diameter of the lens and away from the light shield.

2. The optical system according to claim 1, wherein the lens array is disposed along the optical axis, and the light shield is disposed, in the direction orthogonal to the optical axis, outside of the lens array and a distance away from the optical axis.

3. The optical system according to claim 1, further comprising:
   an urging member configured to urge one end of the lens array in the direction orthogonal to the optical axis; and
   an abutting member having a contact surface that the other end of the lens array is abutted against in the direction orthogonal to the optical axis.

4. The optical system according to claim 3, wherein
   the urging member is disposed on a light shield side of the lens array in the direction orthogonal to the optical axis, and
   the contact surface is on an opposite side of the light shield in the direction orthogonal to the optical axis.

5. The optical system according to claim 3, wherein
   the urging member is disposed on an opposite side of the light shield in the direction orthogonal to the optical axis so that the lens array is between the urging member and the light shield, and
   the contact surface is on a light shield side in the direction orthogonal to the optical axis.

6. The optical system according to claim 1, wherein
   the lens array includes a first fly-eye lens and a second fly-eye lens, and
   the first fly-eye lens is spaced apart from the second fly-eye lens along the optical axis.

7. The optical system according to claim 1, further comprising an optical element configured to:
   transmit the first light emitted from the optical modulator, and
   reflect the second light emitted from the optical modulator.

8. The optical system according to claim 7, further comprising a projection optical system configured to receive and project the first light transmitted through the optical element toward a projection target.

9. An image projection apparatus comprising the optical system according to claim 1.

10. The optical system according to claim 1, further comprising a field lens.

11. The optical system according to claim 7, further comprising:
    a field lens, wherein
    the light emitted from the illumination optical system passes through the field lens to the optical element.

12. The optical system according to claim 1, wherein the first effective diameter is larger than the second effective diameter.

13. An optical system, comprising:
    an optical modulator; and
    an illumination optical system configured to emit light to the optical modulator, the illumination optical system including:
    a lens;
    a lens array on an upstream side of the lens in an optical path of the light; and
    a light shield on the upstream side of the lens in the optical path, the light shield configured to block light rays of the light incident within a range of a first effective diameter of the lens, wherein
    the optical modulator is configured to emit the light, incident on the optical modulator, in a first direction and in a second direction different from the first direction, and a center of a second effective diameter of the lens array is offset, in a direction orthogonal to an optical axis of the illumination optical system, from a center of the first effective diameter of the lens and away from the light shield.

14. The optical system according to claim 13, wherein the lens array is disposed along the optical axis, and the light shield is disposed, in the direction orthogonal to the optical axis, outside of the lens array and a distance away from the optical axis.

15. The optical system according to claim 13, further comprising:
an urging member configured to urge one end of the lens array in the direction orthogonal to the optical axis; and
an abutting member having a contact surface that the other end of the lens array is abutted against in the direction orthogonal to the optical axis.

16. The optical system according to claim 15, wherein the urging member is disposed on a light shield side of the lens array in the direction orthogonal to the optical axis, and
the contact surface is on an opposite side of the light shield in the direction orthogonal to the optical axis.

17. The optical system according to claim 15, wherein the urging member is disposed on an opposite side of the light shield in the direction orthogonal to the optical axis so that the lens array is between the urging member and the light shield, and
the contact surface is on a light shield side in the direction orthogonal to the optical axis.

18. The optical system according to claim 13, wherein the lens array includes a first fly-eye lens and a second fly-eye lens, and
the first fly-eye lens is spaced apart from the second fly-eye lens along the optical axis.

19. The optical system according to claim 13, further comprising an optical element configured to:
transmit the first light emitted from the optical modulator, and
reflect the second light emitted from the optical modulator.

20. The optical system according to claim 19, further comprising a projection optical system configured to receive and project the first light transmitted through the optical element toward a projection target.

* * * * *